United States Patent
Do et al.

(10) Patent No.: US 7,778,371 B2
(45) Date of Patent: Aug. 17, 2010

(54) DIGITALLY CLOCK WITH SELECTABLE FREQUENCY AND DUTY CYCLE

(75) Inventors: Viet Linh Do, Carlsbad, CA (US); Hongming An, San Diego, CA (US); Jim Lew, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 12/423,774

(22) Filed: Apr. 14, 2009

(65) Prior Publication Data

US 2009/0201066 A1    Aug. 13, 2009

Related U.S. Application Data

(63) Continuation-in-part of application No. 11/717,261, filed on Mar. 12, 2007, now Pat. No. 7,560,426.

(51) Int. Cl.
*H04L 7/00* (2006.01)

(52) U.S. Cl. .................. 375/371; 375/327; 375/354; 375/362; 375/373; 375/376; 327/115; 327/117; 327/156

(58) Field of Classification Search ........... 375/243, 375/250, 255, 259, 60, 267, 299, 302, 306, 375/316, 327, 355, 359, 370, 371, 375
See application file for complete search history.

(56) References Cited

U.S. PATENT DOCUMENTS

| 6,948,098 | B2* | 9/2005 | Pillay et al. | 714/34 |
| 7,512,203 | B2* | 3/2009 | Eldredge et al. | 375/371 |
| 7,580,491 | B2* | 8/2009 | Kim et al. | 375/354 |
| 2006/0222134 | A1* | 10/2006 | Eldredge et al. | 375/371 |
| 2008/0024240 | A1* | 1/2008 | Wang | 332/127 |
| 2008/0164917 | A1* | 7/2008 | Floyd et al. | 327/117 |
| 2008/0204088 | A1* | 8/2008 | Garlapati et al. | 327/115 |
| 2008/0265958 | A1* | 10/2008 | Beaulaton et al. | 327/156 |

* cited by examiner

*Primary Examiner*—Shuwang Liu
*Assistant Examiner*—Hirdepal Singh
(74) *Attorney, Agent, or Firm*—Law Office of Gerald Maliszewski; Gerald Maliszewski

(57) ABSTRACT

A system and method are provided for controlling the duty cycle and frequency of a digitally generated clock. The method accepts a first clock signal having a fixed first frequency. A frequency control word with a first pattern is loaded into a first plurality of serially-connected registers. A duty cycle control word with a second pattern is loaded into a second plurality of serially-connected registers. A register clock signal is generated in response to the first clock and the first pattern. Then, a digital clock signal is generated having a frequency and duty cycle responsive to the register clock signal and the second pattern.

20 Claims, 14 Drawing Sheets

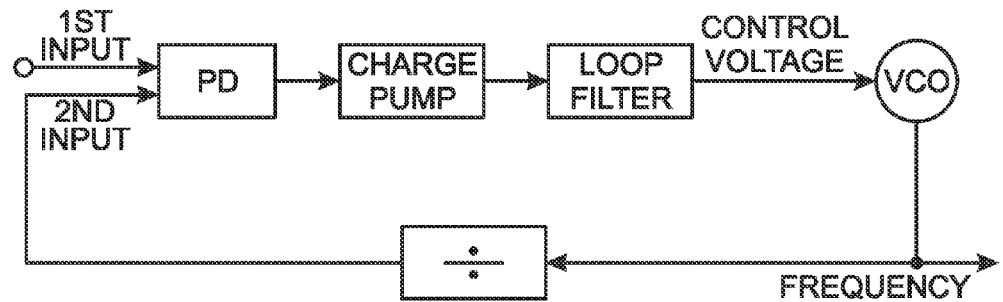
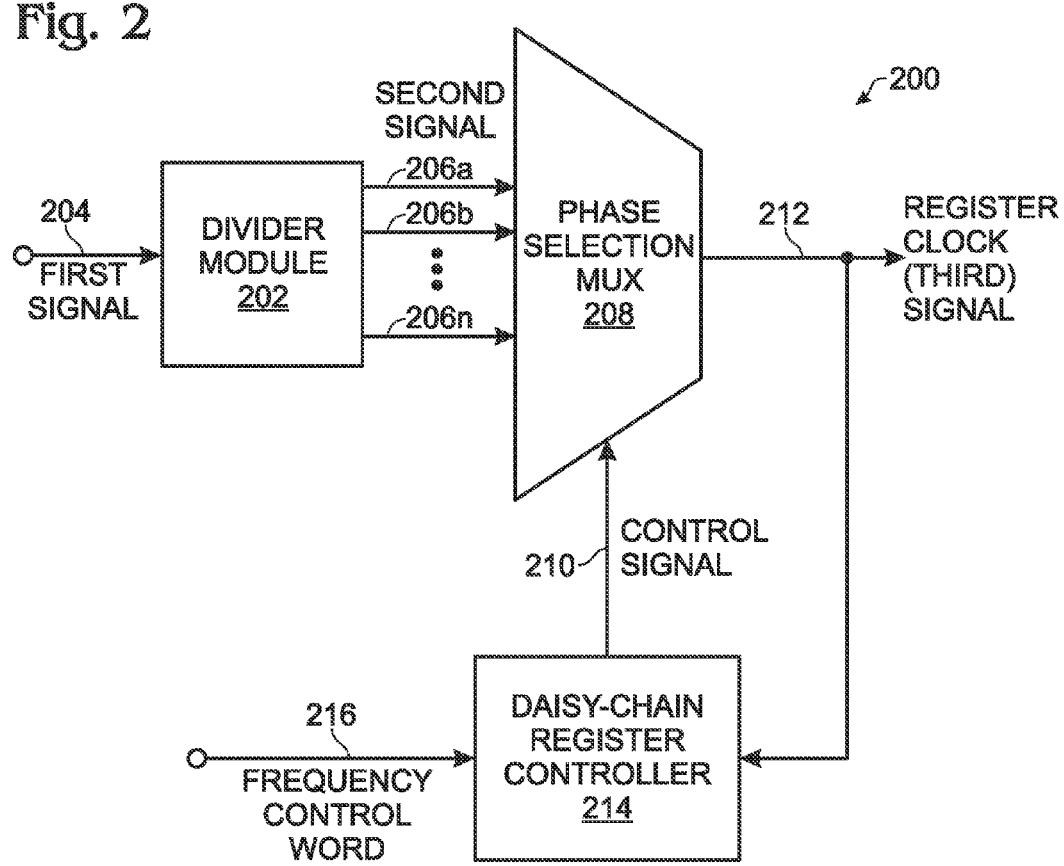

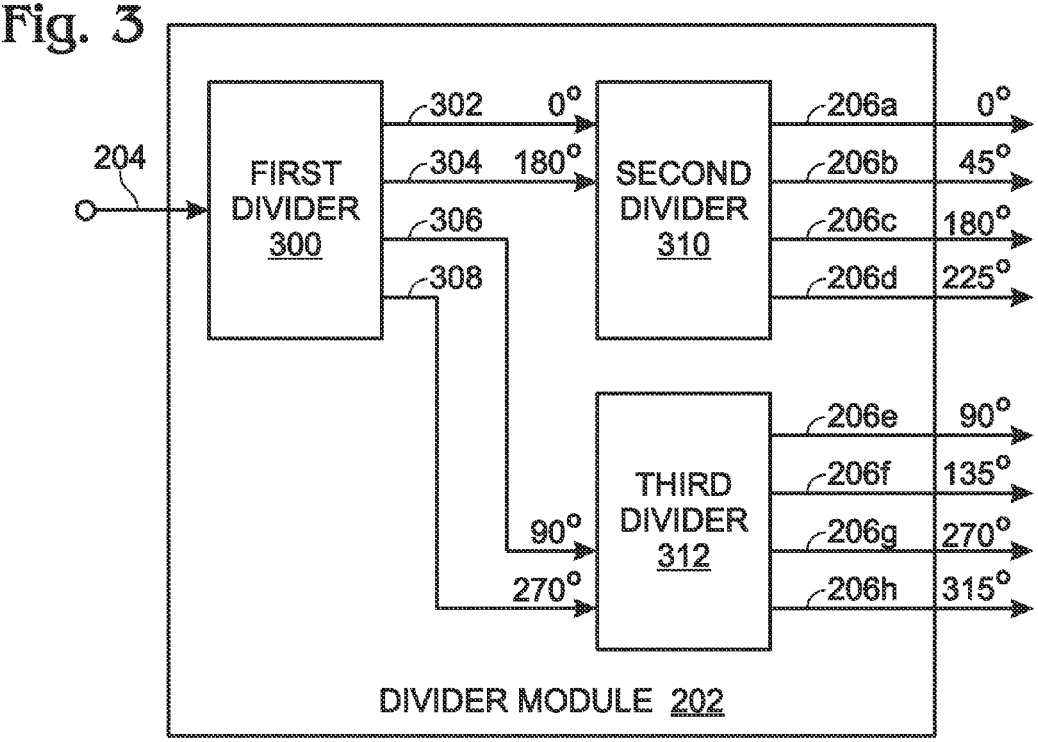
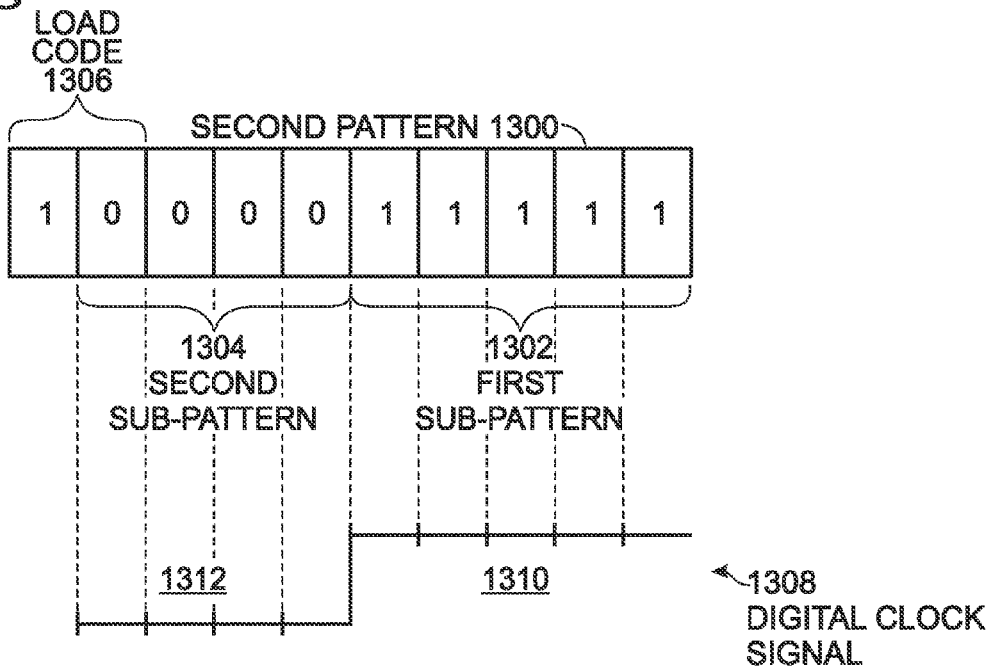

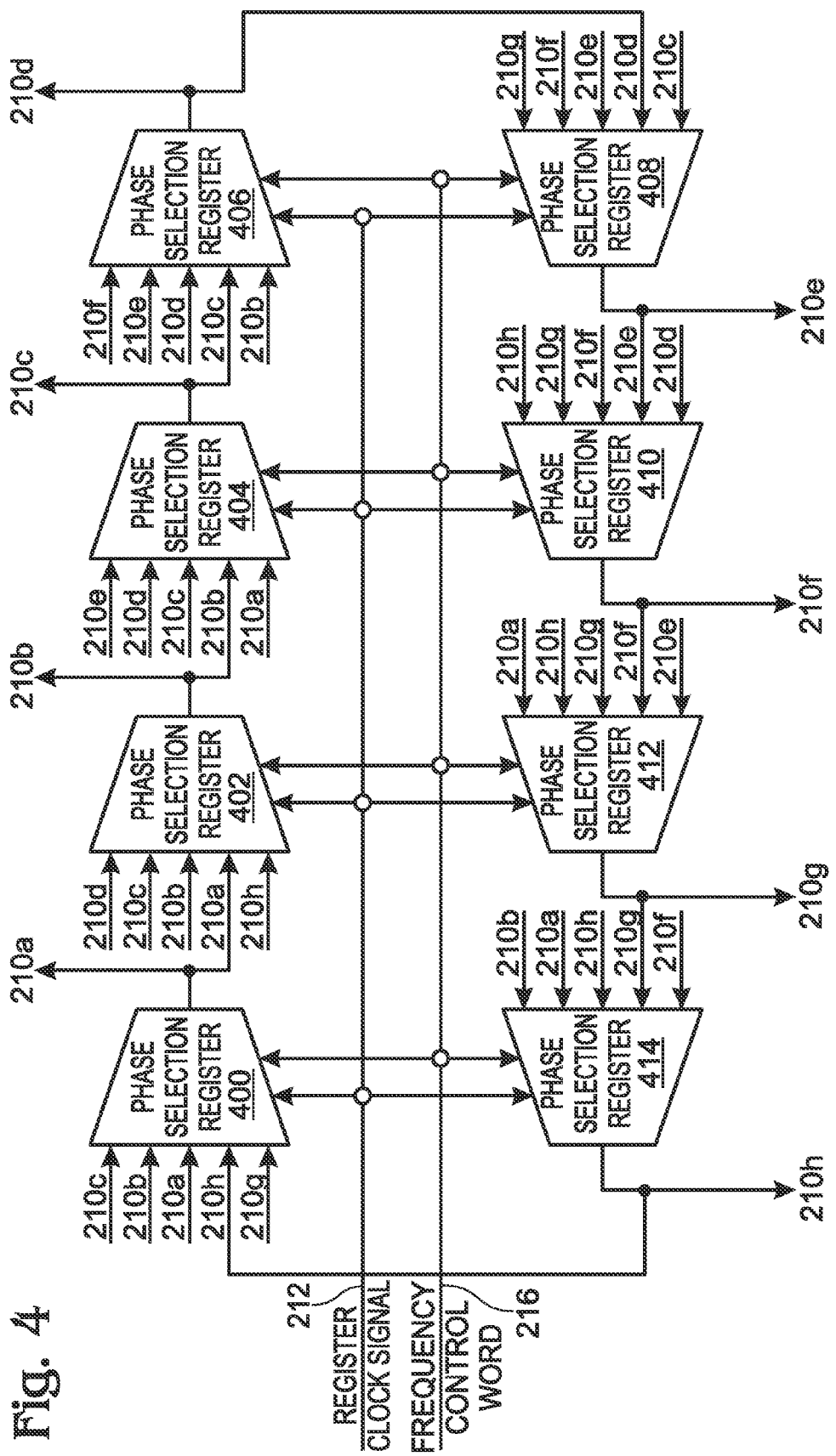

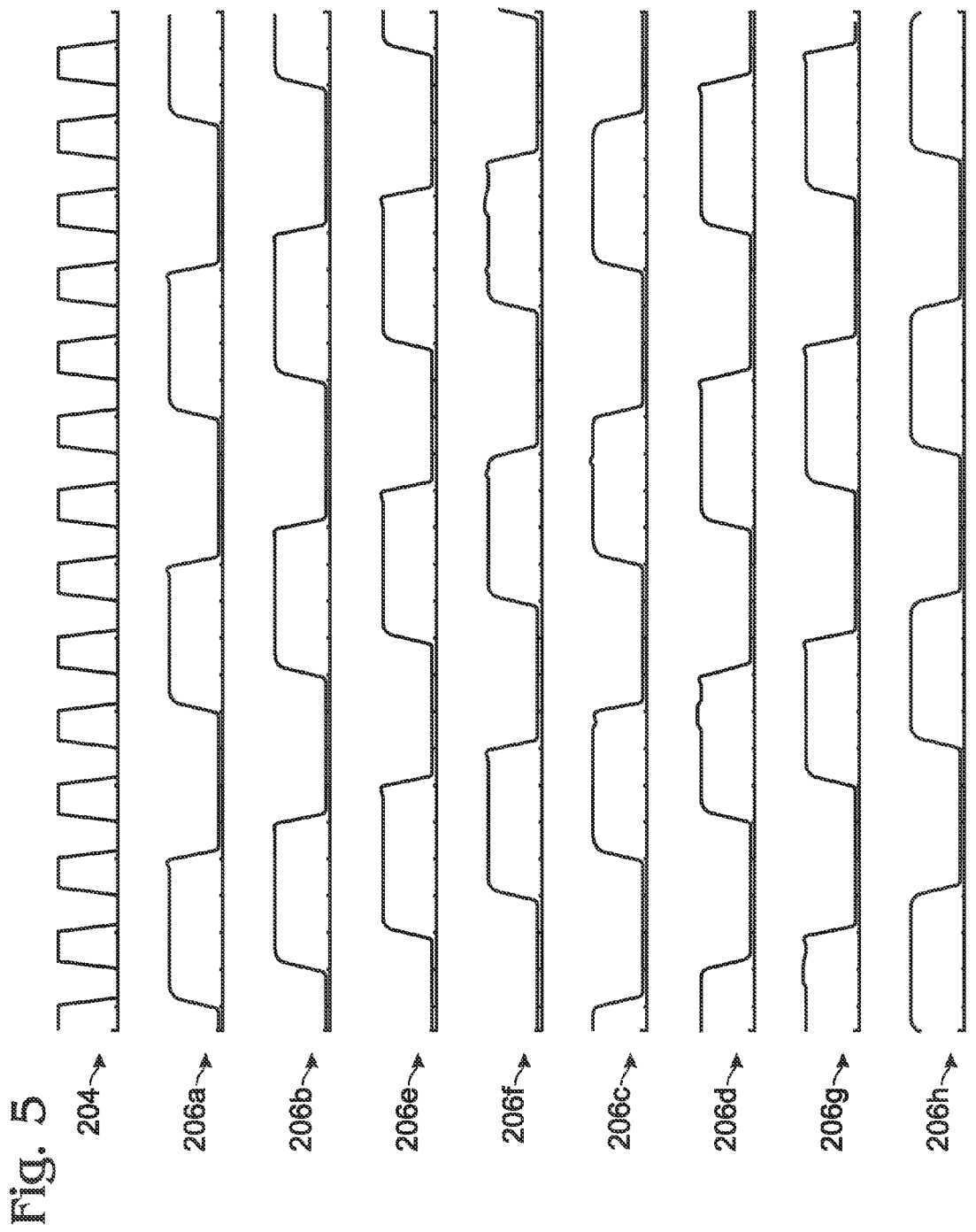

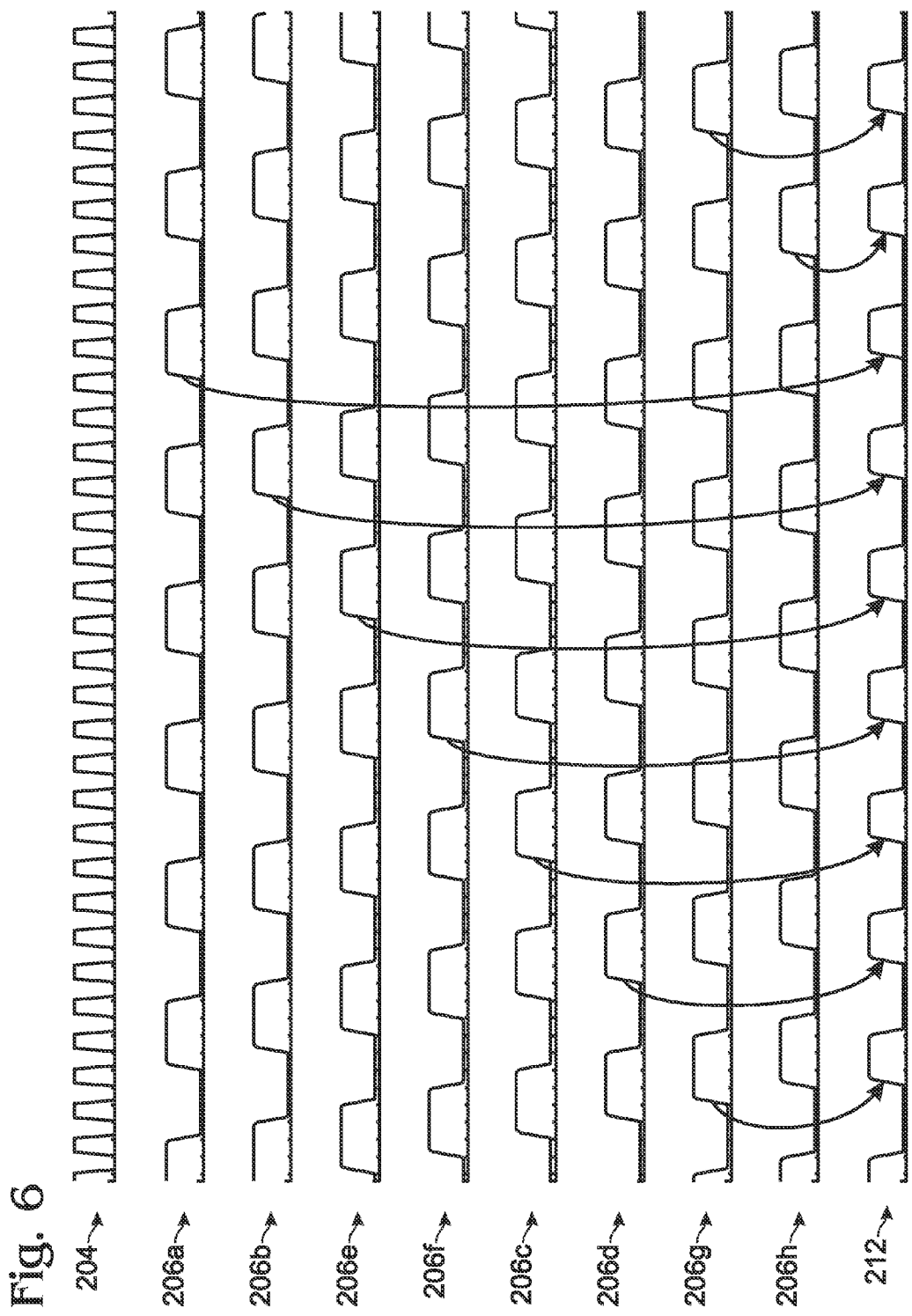

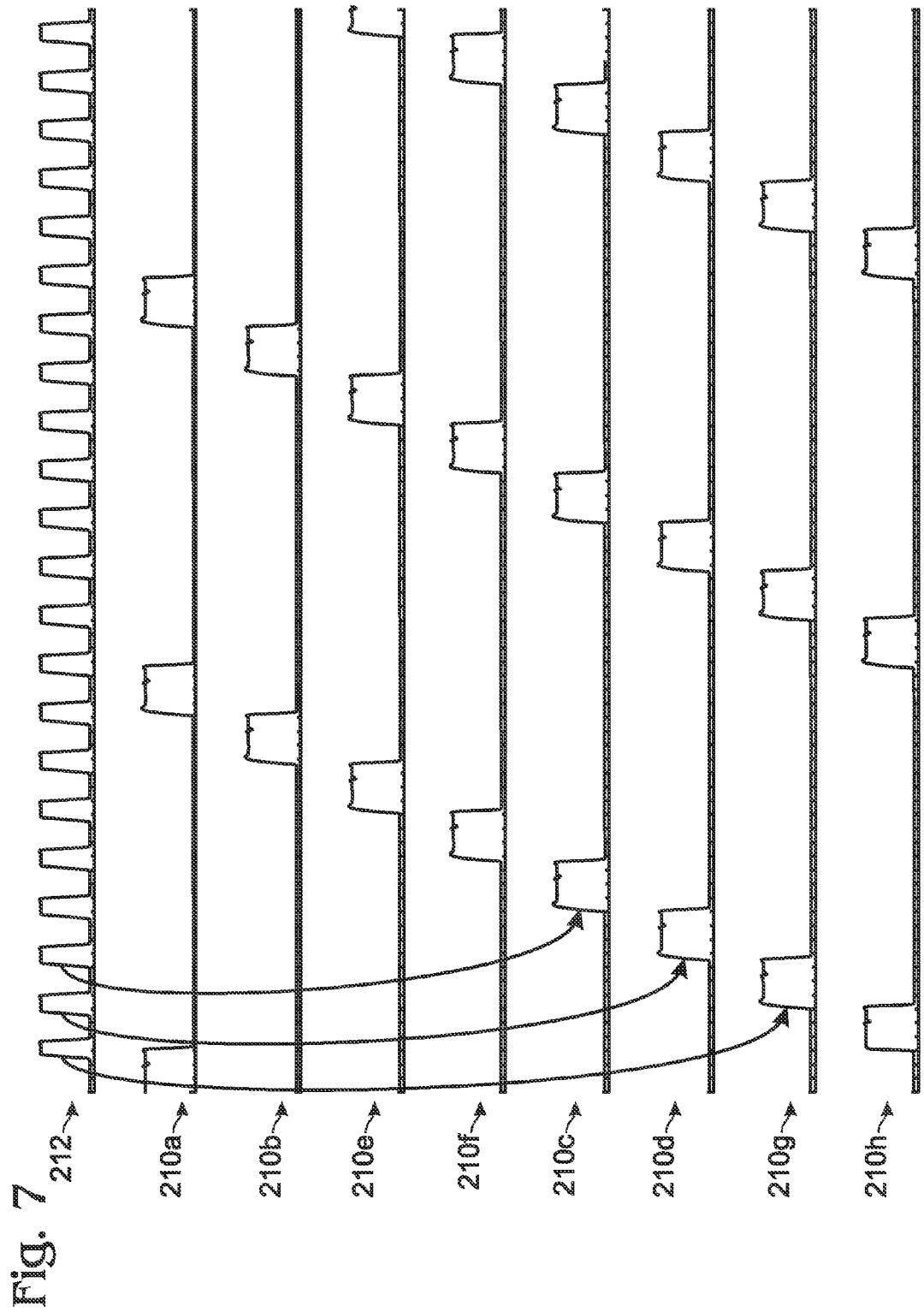

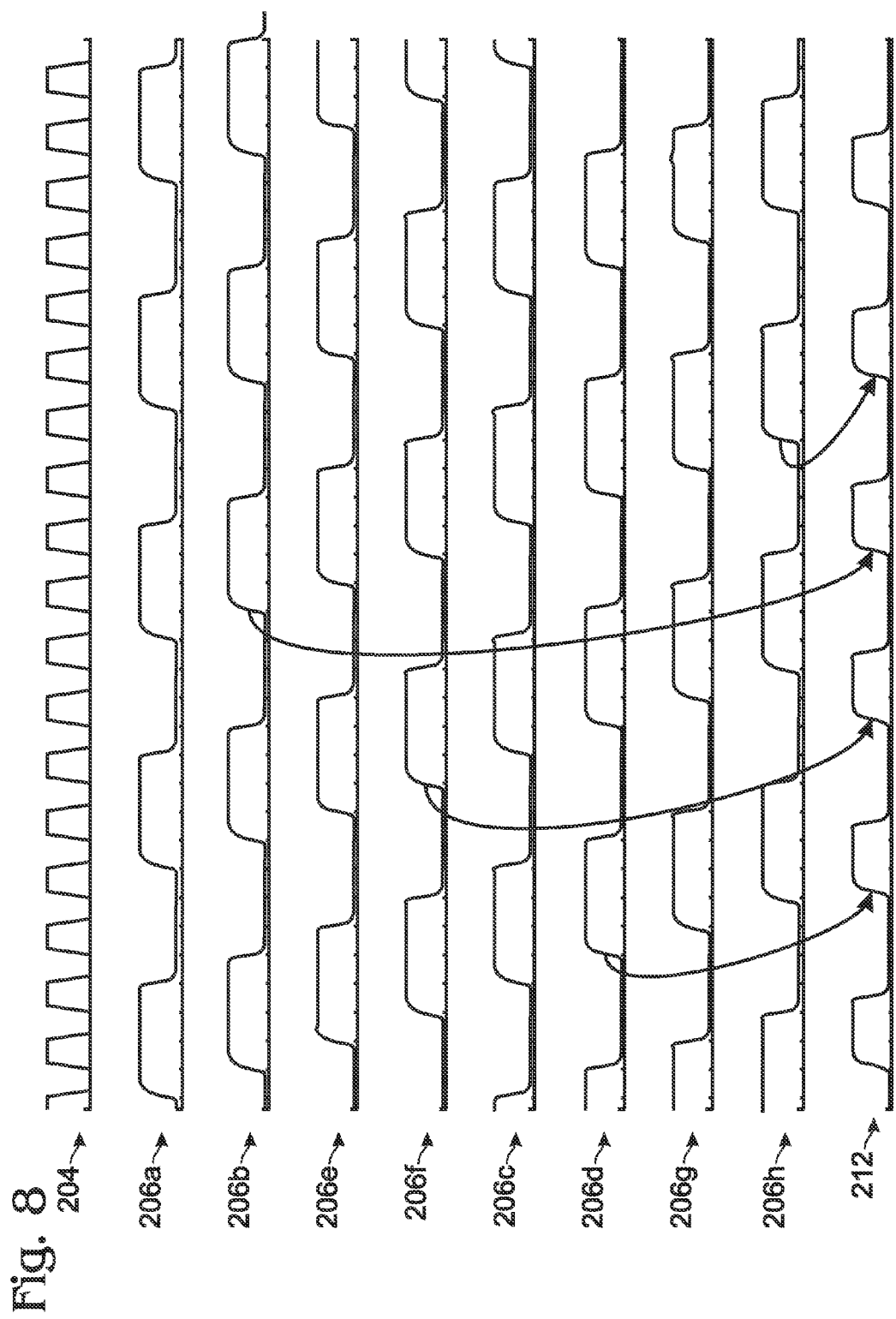

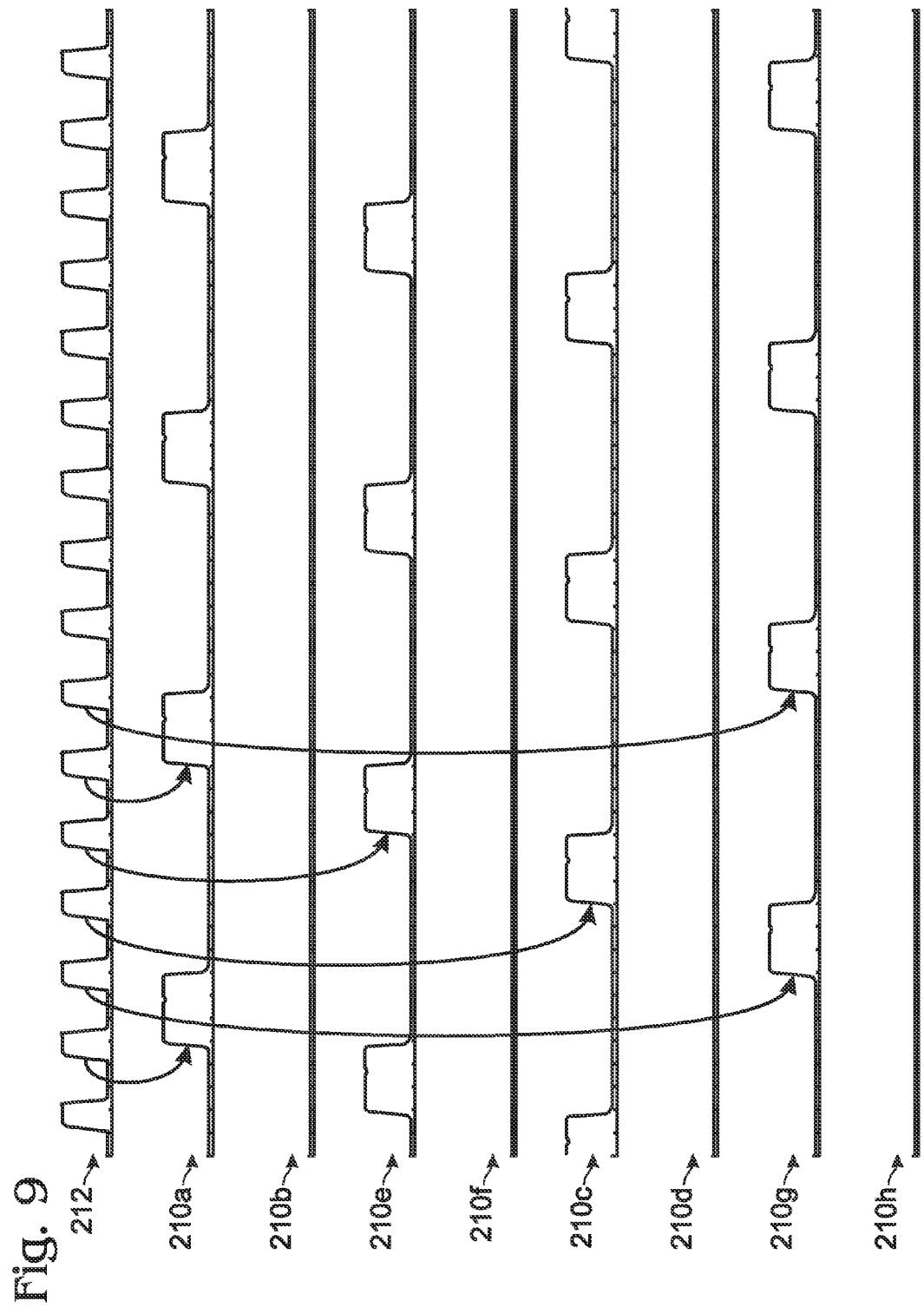

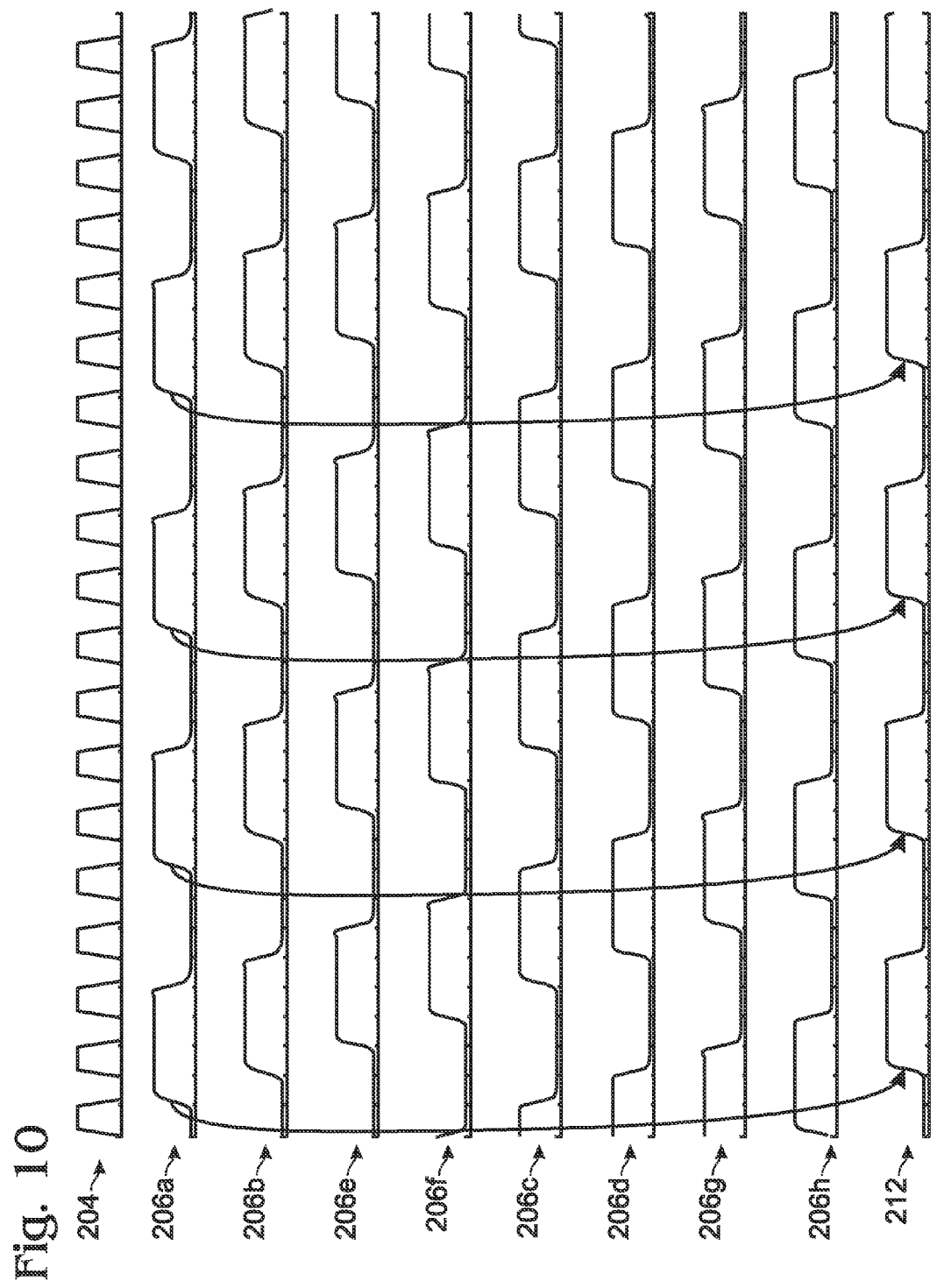

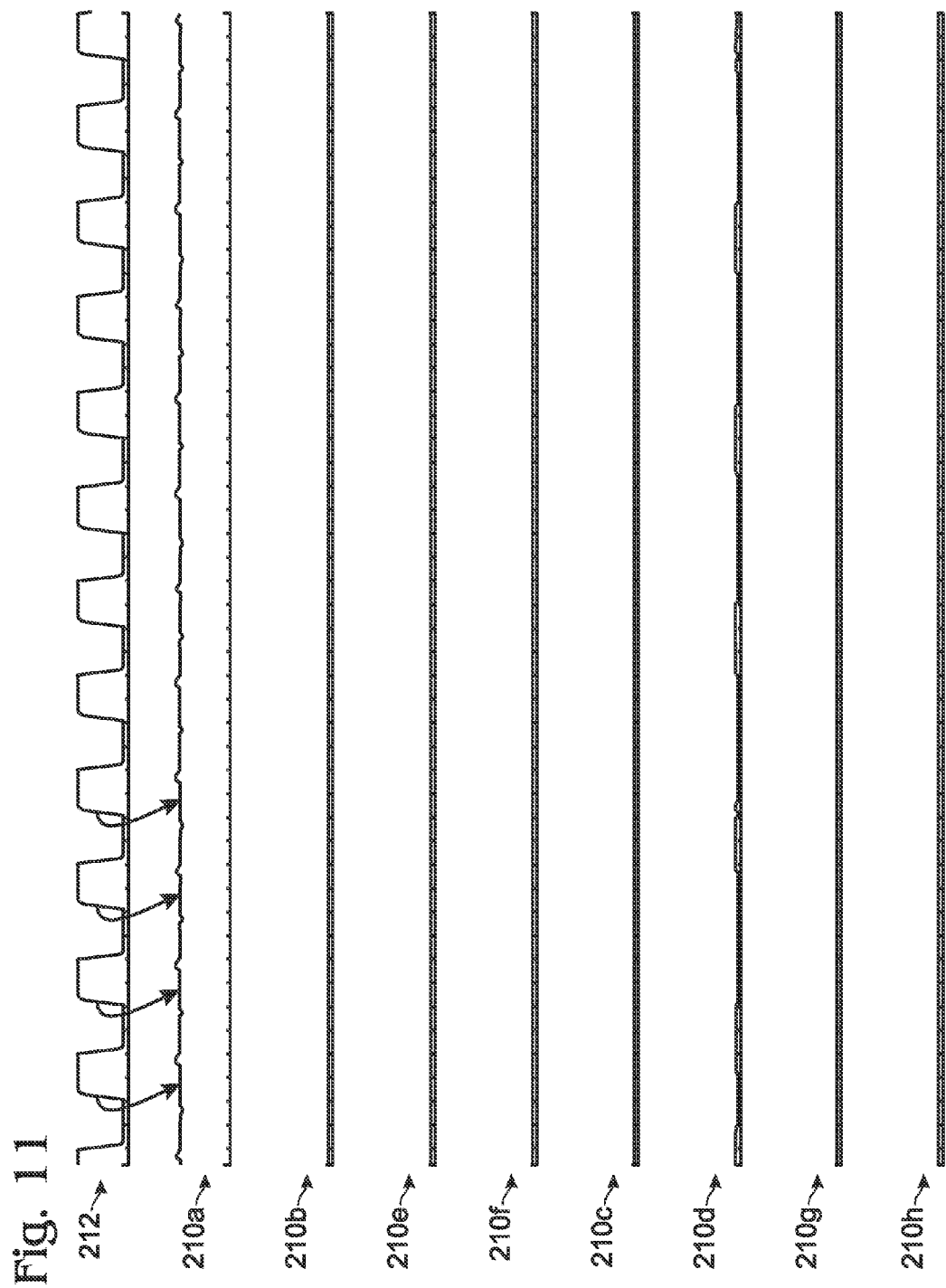

Fig. 15

| AVERAGE SECOND SIGNAL FREQUENCY | SEQUENCE OF SECOND SIGNAL FREQUENCIES | FREQUENCY CONTROL WORD; LOWER ORDER BIT SEQUENCE | DUTY CYCLE CONTROL WORD | DIGITAL CLOCK SIGNAL FREQUENCY |
|---|---|---|---|---|
| 18 | 666 | 0010010 | 00000000000001011 | FIRST CLOCK SIGNAL FREQUENCY /18 |
| 19 | 667 | 0010011 | 00000000000001011 | FIRST CLOCK SIGNAL FREQUENCY /19 |
| 20 | 677 | 0010100 | 00000000000001011 | FIRST CLOCK SIGNAL FREQUENCY /20 |
| 21 | 777 | 0010101 | 00000000000001011 | FIRST CLOCK SIGNAL FREQUENCY /21 |
| ... | ... | ... | ... | ... |
| 25 | 6667 | 0011001 | 00000000000010011 | FIRST CLOCK SIGNAL FREQUENCY /25 |
| ... | ... | ... | ... | ... |
| 104 | 7777777788888888 | 1101000 | 10000000011111111 | FIRST CLOCK SIGNAL FREQUENCY /104 |

DIGITALLY CLOCK WITH SELECTABLE FREQUENCY AND DUTY CYCLE

RELATED APPLICATIONS

This application is a Continuation-in-Part of a pending application entitled, HIGH SPEED MULTI-MODULUS PRESCALAR DIVIDER, invented by An et al., Ser. No. 11/717,261, filed Mar. 12, 2007, now U.S. Pat. No. 7,560,426, which is incorporated herein by reference.

BACKGROUND OF THE INVENTION

1. Field of the Invention

This invention generally relates to electronic circuitry and, more particularly, to a system and method for using multi-modulus prescalar division as a basis for generating a high-speed digital clock signal with a selectable frequency and duty cycle.

2. Description of the Related Art

FIG. 1 is a schematic block diagram of a conventional phase locked loop (prior art). A phase detector (or frequency detector) receives a first input signal, such as might be supplied on a serial data stream or a clock source, and compares it to a second input signal supplied by the divider. The phase detector (PD) generates an output that is responsive to difference in timing between the two input signals. A charge-pump may be added to improve the response of the PLL, as the phase detector output does not necessarily have enough drive to instantaneously charge (or discharge) the loop filter reactances. The loop filter is typically a low-pass filter, and is used to control the overall loop response. The voltage controlled oscillator (VCO) supplies an output frequency that is responsive to the input voltage level. The loop is locked when the phase detector inputs match. The divider is typically inserted in the path between the VCO and the phase detector. The divider has two primary functions. The divider permits the phase detector to be operated at a lower frequency. Also, the divider acts, as a relatively simple means of controlling the VCO output frequency.

The VCO can be controlled to supply a number of different frequencies by manipulating the division ratio. This task is relatively simple if the divider is a hardware device designed to divide the VCO frequency by a range of selectable integer numbers. "Pulse-swallowing" is one technique that can be used to obtain a desired division ratio. Pulse-swallowing also permits non-integer and odd-inter ratios to be obtained. For example, a divisor of 3 may be obtained if the VCO, frequency is alternately divided by the divisors of 2 and 4. However, the pulse-swallowing technique may generate undesirable harmonic frequencies components. Further, it may not be possible to conveniently generate every required frequency using just the pulse-swallowing technique. Further, these analog signals cannot be used as a clock in digital circuitry, and analog-to-digital converters are too slow to generate a high speed digital clock.

It would be advantageous if a high speed digital clock signal could be generated from a fixed VCO frequency, and made selectable to supply a wide range of frequencies and duty cycles.

SUMMARY OF THE INVENTION

The multi-modulus divider is presented that divides a signal using division ratios such as 0.75, 0.875, 1, 1.125, and 1.25, dynamically in response to a control signal, by selecting between different phases of a reference frequency. With the addition of fixed ratio dividers, for example divide by 8, division ratios of 6, 7, 8, 9, and 10 can be obtained. The divider is able to divide high speed input signals, without glitches while consuming low amounts of power. Therefore, the circuitry has application as, a high performance prescalar in fractional-N synthesizers, especially in fractional-N synthesizers with high loop frequencies where low dividing ratios are required.

Using the limited number of division ratios created by the multi-modulus divider as a clock, serially-connected shift registers can be used to supply a duty cycle control word. A wide range of digital clock frequencies and duty cycles can be generated, depending on the combination of the duty cycle control word loaded in the registers and the division ratios used to clock the registers.

Accordingly, a method is provided for controlling the duty cycle and frequency of a digitally generated clock. The method accepts a first clock signal having a fixed first frequency. A frequency control word with a first pattern is loaded into a first plurality of serially-connected registers. A duty cycle control word with a second pattern is loaded into a second plurality of serially-connected registers. A register clock signal is generated in response to the first clock and the first pattern. Then, a digital clock signal is generated having a frequency and duty cycle responsive to the register clock signal and the second pattern.

The first clock signal is divided by an integer n and supplied as a second signal having a plurality of phases. The register clock signal is generated by serially supplying the frequency control word to a chain of phase selection registers clocked by the register clock signal, generating a sequence of phase selection register output pulses in response to the register clock signal and the first pattern, and using the generated register output pulses to select the phases of the second signal.

The frequency control word first pattern includes a plurality of sub-patterns and a sequence of register clock signal rates is generated, where each rate is responsive to a sub-pattern in the first pattern. Likewise, the duty cycle control word second pattern includes a plurality of sub-patterns, and the digital clock signal frequency and duty cycle are responsive to the sequence of register clock rates and the sub-patterns in the second pattern.

Additional details of the above-described method and a system for controlling the duty cycle and frequency of a digitally generated clock are provided below.

BRIEF DESCRIPTION OF THE DRAWINGS

FIG. 1 is a schematic block diagram of a conventional phase locked loop (prior art).

FIG. 2 is a schematic block diagram of a system for multi-modulus division.

FIG. 3 is a schematic block diagram of an exemplary divider module, of FIG. 2 in greater detail.

FIG. 4 is a schematic block diagram of an exemplary daisy-chain register controller of FIG. 2 in greater detail.

FIG. 5 is a timing diagram contrasting the first signal and second signal phase outputs.

FIG. 6 is a timing diagram depicting the order of second signal phase outputs that must be selected to obtain a division ratio of 3.5, with respect to the first frequency, assuming n=4.

FIG. 7 is a timing diagram-depicting the sequence of phase selection register outputs that are selected in order to obtain the 3.5 division ratio of FIG. 6.

FIG. 8 is a timing diagram depicting the sequence of second signal phase outputs that are selected in order to obtain the division ratio of 3, with respect to the first frequency, assuming n=4.

FIG. 9 is a timing diagram depicting the sequence of phase selection register outputs that are selected in order to obtain the 3 division ratio of FIG. 8.

FIG. 10 is a timing diagram depicting the order of second signal phase outputs that must be selected to obtain a division ratio of 4, with respect to the first frequency, assuming n=4.

FIG. 11 is a timing diagram depicting the sequence of phase selection register outputs that are selected in order to obtain the 1 division ratio, with respect to the second frequency.

FIG. 13 is a diagram depicting the relationship between the duty cycle control word and the digital clock signal.

FIG. 15 is a table depicting the relationship between second signal frequency, frequency control word, duty control word, and digital clock signal.

DETAILED DESCRIPTION

Figure 12:
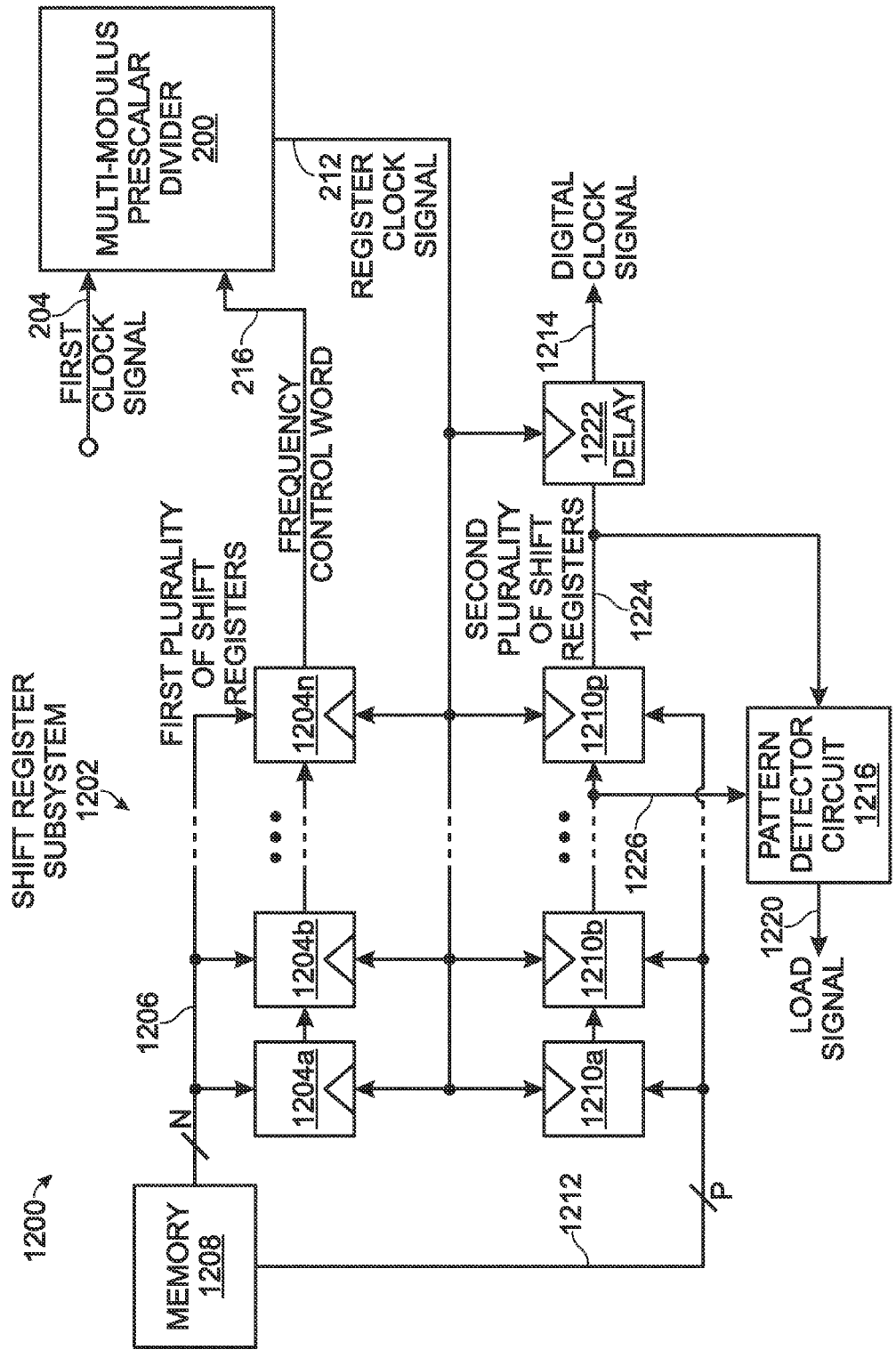
FIG. 12 is a schematic block diagram of a system for controlling the duty cycle and frequency of a digitally generated clock.

FIG. 2 is a schematic block diagram of a system for multi-modulus division. The system 200 comprises a divider module 202 having an input on line 204 to accept a first signal (first clock signal) having a first frequency. Referencing FIG. 1 briefly, line 204 may be a VCO output for example. The divider module 202 divides the first frequency by an integral number n and supplies a second signal with a plurality of phase outputs on line 206, each having a second frequency. Phase output lines 206a through 206n are shown, where n is not limited to any particular number. In one aspect not shown, the divider module 202 divides the first clock signal by m and a second fixed divider following the MUX, divides the second signal by q, where n=m·q. In another aspect not shown, the divider module divides the first clock signal by 1, and a second fixed divider following the MUX divides the second signal by n.

A phase selection multiplexer (MUX) 208 has an input on lines 206 to accept the plurality of second signal phase outputs, and an input on line 210 to accept a control signal. The phase selection multiplexer 208 has an output on line 212 to supply a second signal phase selected in response to the control signal on line 210. A daisy-chain register controller 214 has an output on line 210 to supply the control signal for dynamically selecting the second signal phase outputs, in response to a frequency control word on line 216. In this manner, the phase selection multiplexer 208 supplies the selected phase outputs as a register clock (third) signal with a frequency on line 212. It should be noted that although the signals are presented as single-ended signals referenced to dc or ground voltage for simplicity, in other aspects (not shown) the system may be enabled with differential signals.

FIG. 3 is a schematic block diagram of an exemplary divider module of FIG. 2 in greater detail. Typically, the divider module 202 generates a second signal with a first number of equally-spaced phase outputs. In this example, 8-equally spaced (45° offset) phases are created. A first divider 300 accepts the input signal on line 204 and divides the signal by an even-integer value n/2. A 0° phase offset, signal is supplied on line 302, and a 180° phase offset signal is supplied on line 304. Note: the phase is defined with respect to the leading edge of the input signal on line 204. Also note: in this example, the signals on lines 302 and 304 are differential signals. A 90° phase offset signal is supplied on line 306, and a 270° phase offset signal is supplied on line 308.

A second divider 310 accepts the input signal on lines 302 and 304 and divides the signal by an integer value n/2 (e.g., 2). 0°, 45°, 180°, and 225° phase offset signals are supplied on lines 206a through 206d. A third divider 312 accepts the input signal on lines 306 and 308 and divides the signal by integer value n/2 (e.g., 2). 90°, 135°, 270°, and 315° phase offset signals are supplied on lines 206e through 206h. It should be understood that the system is not limited to any particular division ratio or any particular number of phase outputs.

FIG. 4 is a schematic block diagram of an exemplary daisy-chain register controller of FIG. 2 in greater detail. The daisy-chain register controller 214 includes a plurality of phase selection registers with daisy-chain-connected outputs. Here, eight phase selection registers 400 through 414 are shown. The phase selection registers in this example have a 5 inputs and one output. The register selection is controlled by the 2-bit frequency control word. The dividing mode can be changed dynamically. The use of eight phase selection registers corresponds with the use of eight phase outputs (see FIG. 3). Although the exemplary daisy-chain controller is intended to continue the example started in FIG. 3, it should be understood that the controller 214 is not necessarily limited to eight registers. Typically, the number of phase selection registers in the controller 214 matches the number of second signal phase outputs. The daisy-chain controller accepts the register clock signal on line 212, and generates a sequence of register output pulses in response to the register clock signals. That is, each phase selection register generates an output pulse in response to the combination of the register clock pulse and the output pulses from other phase selection registers in the chain of registers.

At each clock cycle, only one of the phase selection registers gets a high (or low) output pulse from all the phase selection registers inputs. Depending on the frequency control word, the high pulse remains at same register output (assuming n=4 in the divider module, divide by 4 mode), or is shifted clockwise to next register output (n=4, divide by 3.5 mode), or is shifted clockwise to next alternate register output (n=4, divide by 3 mode), or is shifted anti-clockwise to next register output (n=4, divide by 4.5 mode), or is shifted anti-clockwise to next alternate register (n=4, divide by 5 mode), at the next clock. The controller 214 generates a sequence of phase selection register output pulses for use as the control signal supplied to the phase selection multiplexer on line 210. The sequence of phase selection register output pulses is generated in response to the frequency control word signal received on line 216. In one aspect, the frequency control word is a 2-bit word that is serially supplied once per register clock cycle.

Considering FIGS. 2, 3, and 4, the phase selection MUX 208 performs the phase selection of outputs 202 in accordance with the control signals on line 210. In one aspect, the phase selection MUX 208 generates the register clock signal on line 212 using the following logic function:

$$212 = 206a*210a + 206b*210b + 206c*210c + 206d*210d + 206e*210e + 206f*210f + 206g*210g + 200h*210h.$$

There are many circuit topologies that could be used to implement this function. For high speed dividing applications, the delay of the phase selection MUX 208 should be controlled and minimized. In this regards, a small number of symmetrical delay stages are preferred.

FIG. 5 is a timing diagram contrasting the first signal 204 and second signal phase outputs 206a-206h. As shown, the divider module generates 8 phases with an equal phase delay of 45 degrees from neighboring pulses. This diagram assumes that the second frequency (the frequency of the second signal) is one-fourth the first clock signal frequency (i.e. n=4).

FIG. 6 is a timing diagram depicting the order of second signal phase outputs that must be selected to obtain a division ratio of 3.5, with respect to the first frequency, assuming n=4. Alternately stated, the register clock frequency is equal the second signal frequency multiplied by 0.875. As shown, the rising edge of a different phase is selected each clock cycle. Generally, the phase selection multiplexer supplies a register clock signal frequency that is a non-integer or odd-integer quotient of the second signal frequency.

FIG. 7 is a timing diagram depicting the sequence of phase selection register outputs that are selected in order to obtain the 3.5 division ratio of FIG. 6. As shown, the daisy-chain register controller has only one pulse high per clock cycle, and shifts to next register output clockwise in the next clock. One phase selection register pulse selects the corresponding phase signal of 206, and then the next phase signal 206 is selected by the next phase selection register output. The phase signal 206 chosen by next phase selection register-output pulse is 45 degree advanced, as compared to the previous selected signal. A dividing ratio of 0.875 is achieved, with respect to the second signal.

FIG. 8 is a timing diagram depicting the sequence of second signal phase outputs that are selected in order to obtain the division ratio of 3, with respect to the first frequency, assuming n=4. As shown, 4 out of the 8 output signal rise edges are selected. The third signal frequency is equal the second frequency multiplied by 0.75.

FIG. 9 is a timing diagram depicting the sequence of phase selection register outputs that are selected in order to obtain the 3 division ratio of FIG. 8. The phase signal of 206 chosen by phase selection register output pulses that are advanced 90 degrees with respect to the previously selected signal.

FIG. 10 is a timing diagram depicting the order of second signal phase outputs that must be selected to obtain a division ratio of 4, with respect to the first frequency, assuming n=4. Alternately stated, the register clock (third) signal frequency is equal the second frequency multiplied by 1. As shown, only one of the 8 output phases is selected. The phase selection multiplexer supplies phase outputs having a non-varying (first) period as a third signal with a frequency equal to the second frequency (of the second signal).

FIG. 11 is a timing diagram depicting the sequence of phase selection register outputs that are selected in order to obtain the 1 division ratio, with respect to the second frequency. Only one of the 8 phase output signals 206 is selected as output of phase selection MUX. As shown, the daisy-chain register controller generates a first pattern of register output pulses exclusively from a single register (on line 210a, see FIG. 4).

In summary, the divider module 202 described above supplies eight second signal outputs, where each output is offset from an adjoining output by 45°. In this example, the phase selection multiplexer creates a third signal with a frequency equal to the second frequency multiplied by one of the following numbers: 0.75, 0.875, 1, 1.125, or 1.25. If the divider module 202 supplies a second signal with a frequency equal to the first frequency divided by four, as described above, the phase selection multiplexer creates a register clock signal with a frequency equal to the first frequency divided by one of the following numbers: 3, 3.5, 4, 4.5, or 5. If a fixed divide-by-2 module is added either before the divider module or after the MUX, ratios of 6, 7, 8, 9, and 10 can be obtained.

It should be noted that the above-mentioned system permits quotients to be selected with almost no delay, to enable pulse-swallowing with a minimum of glitches and spurious noise. It should also be understood that although an 8 phase/8 register system has been described as an illustration, the system is not limited to any particular number of phases/registers.

FIG. 12 is a schematic block diagram of a system for controlling the duty cycle and frequency of a digitally generated clock. The system 1200 comprises a multi-modulus prescalar divider 200 with an input on line 204 to accept a first clock signal having a fixed first frequency, and an interface on line 216 to accept a serial frequency control word. The multi-modulus prescalar divider 200 has an output on line 212 to supply a register clock signal in response to the first clock signal and the frequency control word. Details of the multi-modulus prescalar divider has presented above in the description of FIGS. 2 through 4 above.

A shift register subsystem 1202 includes an interface on line 212 to accept the register clock signal. A first plurality of serially-connected registers 1204 have a parallel interface on line 1206 to parallely load the frequency control word. Shown are registers 1204a though 1204n, where n is a variable not limited to any particular value. Since there are n number of registers, there are n lines in the parallel interface 1206. The frequency control words are stored in memory 1208. The serially-connected registers 1204 serially supply the frequency control word to the multi-modulus prescalar divider on line 216 in response to the register clock signal on line 212.

A second plurality of serially-connected registers 1210 have a parallel interface on line 1212 to parallely load a duty cycle control word. Shown are registers 1210a though 1210p, where p is a variable not limited to any particular value. Since there are p number of registers, there are p lines in the parallel interface 1212. The serially-connected registers 1210 serially supply a digital clock signal on line 1214 having a frequency and duty cycle responsive to the register clock signal and the duty cycle control word.

Viewing FIGS. 2 and 12, the first plurality of shift registers 1204 load a frequency control word with a first pattern and the phase selection MUX 208 supplies a register clock signal on line 212 having a frequency responsive to the first pattern. More explicitly, the chain of serially-connected phase selection registers 214 supplies a sequence of register output pulses on line 210 representing the phase selection signal in response to the first pattern. The phase selection MUX 208 supplies a register clock signal having a frequency responsive to the sequence of register output pulses. The first plurality of shift registers 1204 load a frequency control word first pattern with a plurality of sub-patterns, and the phase selection MUX 208 supplies a sequence of register clock signal rates, where each rate is responsive to a sub-pattern in the first pattern.

Likewise, the second plurality of shift registers 1210 loads a duty cycle control word with a second pattern and supplies a digital clock signal on line 1214 having a frequency and duty cycle responsive to the second pattern. More explicitly, the second plurality of shift registers 1210 loads a duty cycle control word second pattern with a plurality of sub-patterns, and supplies a digital clock signal having a frequency and duty cycle responsive to the sequence of register clock rates and the sub-patterns in the second pattern.

FIG. 13 is a diagram depicting the relationship between the duty cycle control word and the digital clock signal. For example, the second pattern 1300 may comprise a first sub-pattern 1302 of "1" bits, followed by a second sub-pattern 1304 of a "0" bits, followed by the load code 1306. The digital clock signal 1308 provided has a period with a duty cycle high 1310 formed from the first sub-pattern 1302 and a duty cycle low 1312 formed from the second sub-pattern 1304. Note further that the duty cycle high and duty cycle low are supplied at the rate of the register clock. Alternately, the first sub-pattern may be "0" bits and the second sub-pattern "1" bits to create a digital clock signal where the low duty cycle precedes the high duty cycle.

Returning to FIG. 12, the shift register subsystem 1202 further includes a pattern detector circuit 1216 having inputs on lines 1224 and 1226 to accept the serially supplied duty cycle control word. The pattern detector 1216 has an output to supply a load signal on line 1220 in response to detecting a load code in the duty cycle control word. The first plurality of shift registers 1204 and the second plurality of shift registers 1210 load new frequency control and duty cycle control words, respectively, in response to the load signal on line 1220. In one aspect as shown, a delay 1222 is inserted in the path of the duty cycle control word, so that the last bit of the load code is removed from the digital clock signal in response to the load signal.

FUNCTIONAL DESCRIPTION

Figure 14:
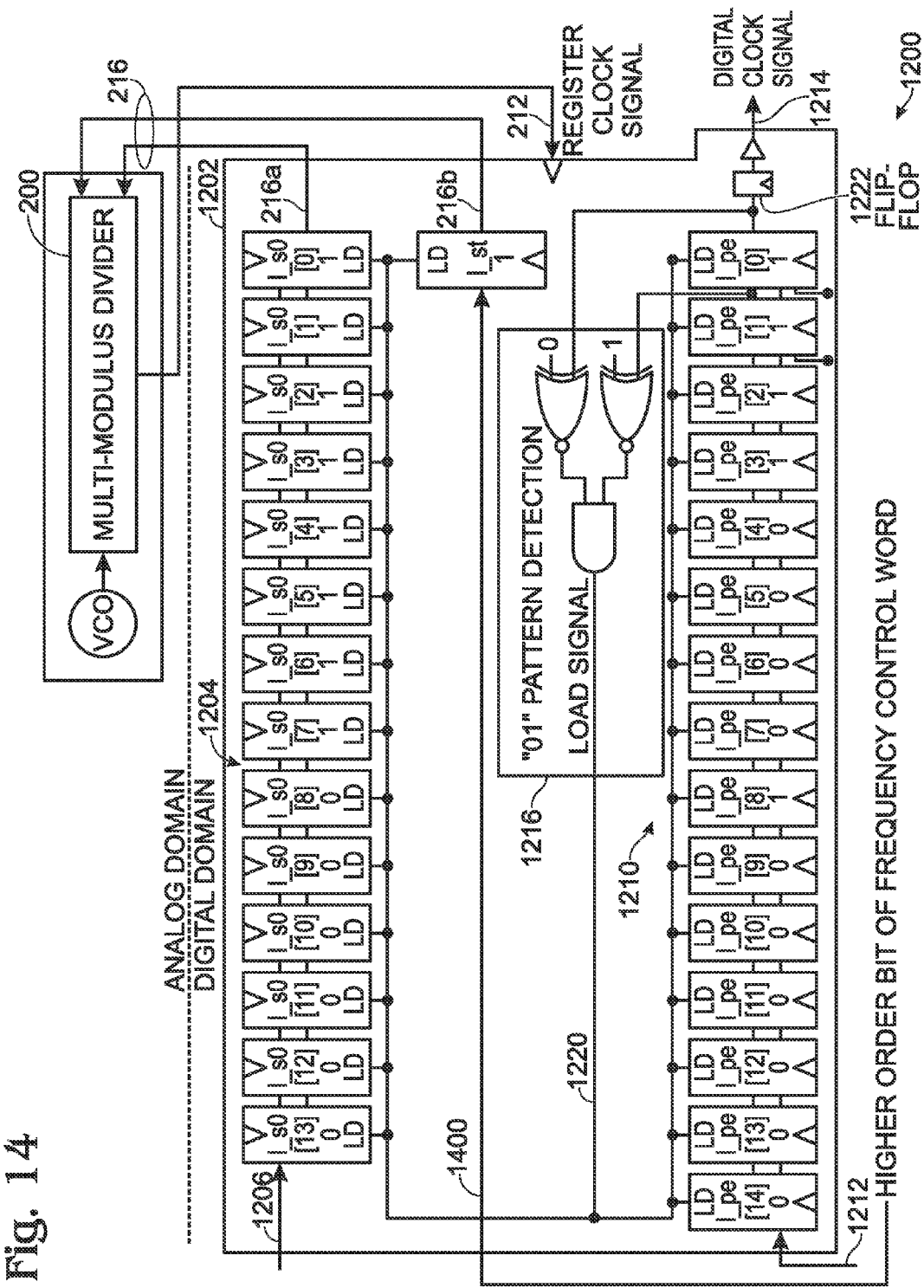
FIG. 14 is a schematic block diagram depicting an exemplary embodiment of the system of FIG. 12 in detail.

FIG. 14 is a schematic block diagram depicting an exemplary embodiment of the system of FIG. 12 in detail. In this aspect, the first plurality of shift registers 1204 provide one bit of the frequency control word on line 216a. The higher order bit of the frequency control word, is supplied on line 1400, and clocked through to the multi-modulus divider on line 216b. In one aspect, the value of the higher order frequency control word bit remains constant, either a "0" or a "1" for the duration of the word. If the pattern detector circuit 1216 detects a "01" pattern in the duty cycle control word, a load signal, is supplied on line 1220, which causes new frequency control and duty cycle control words to be loaded. Note: the first bit of the load code ("0") is also the last bit of the second sub-pattern, and that the number of bits in the first sub-pattern 1302 need not equal the number of bits in the second sub-pattern 1304. Also note that the second bit in the load code ("1") is not the first bit in the next second pattern 1300. The last bit of the load code is lost when the delay (1222, FIG. 12) is cleared in response to the load signal. FIG. 15 is a table depicting the relationship between second signal frequency, frequency control word, duty control word, and digital clock signal. To create a digital clock signal with a frequency equal to the first clock signal frequency divided by 18, the frequency control word generates a sequence of "666". The digital clock signal has an asymmetrical duty cycle of "110" (high, high, low). To create a digital clock signal with a frequency equal to the first clock signal frequency divided by 19, the frequency control word generates a sequence of "667". The digital clock-signal has the asymmetrical duty cycle of "110". However, since the register clock signal is slightly slower, the digital clock signal has a slightly slower frequency. To create a digital clock signal with a frequency equal to the first clock signal frequency divided by 104, the digital clock signal has a symmetrical duty cycle of "111111110000000".

Figure 16:
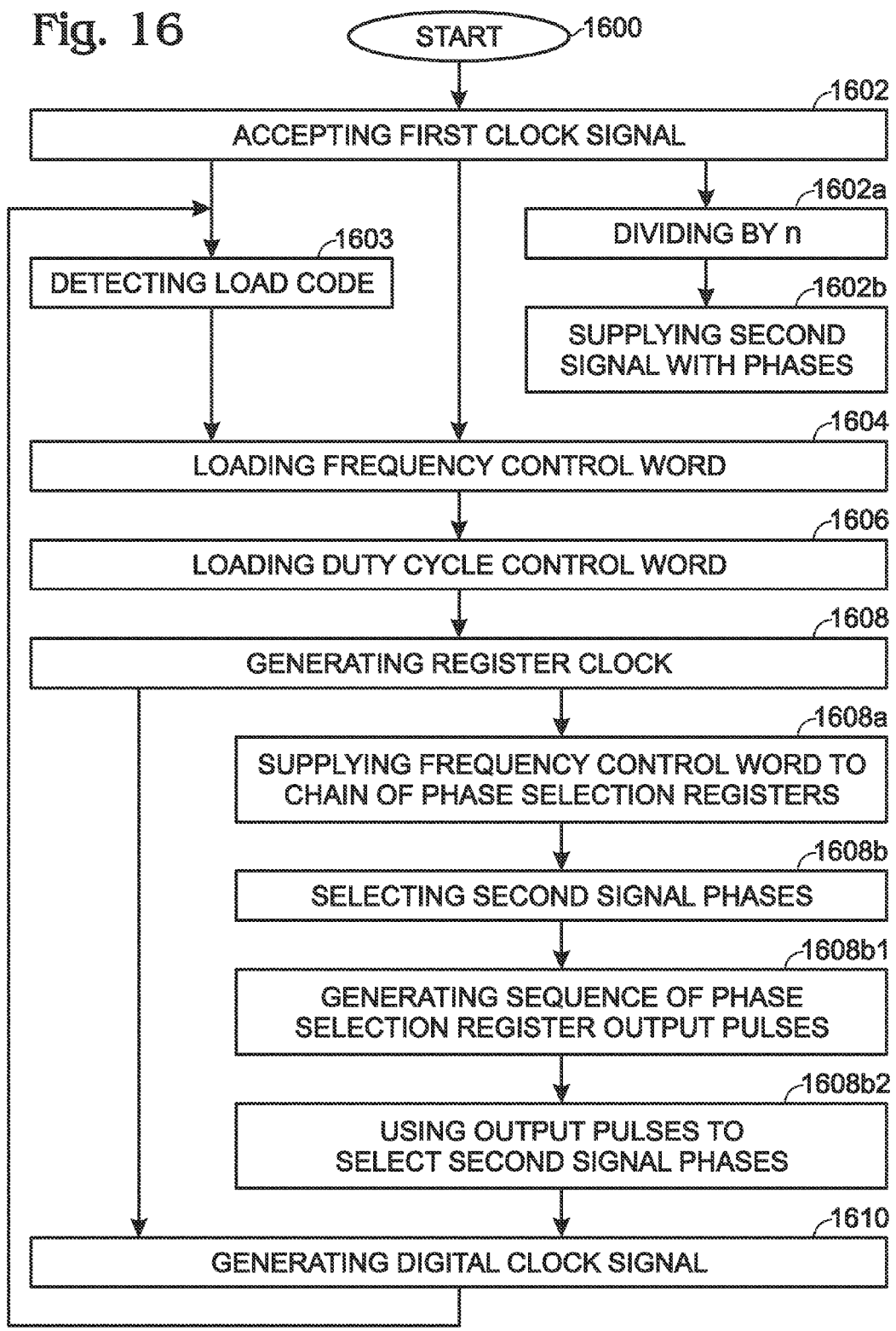
FIG. 16 is a flowchart illustrating a method for controlling the duty cycle and frequency of a digitally generated clock.

FIG. 16 is a flowchart illustrating a method for controlling the duty cycle and frequency of a digitally generated clock. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1600.

Step 1602 accepts a first clock signal having a fixed first frequency. Step 1604 loads a frequency-control word with a first pattern into a first plurality of serially-connected registers. Step 1606 loads a duty-cycle control word with a second pattern into a second plurality of serially-connected registers. Step 1608 generates a register clock signal in response to the first clock and the first pattern. Step 1610 generates a digital clock signal having a frequency and duty cycle responsive to the register clock signal and the second pattern.

In one aspect, accepting the first clock signal in Step 1602 includes substeps. Step 1602a divides the first clock signal by an integer n, and Step 1602b supplies a second signal having a plurality of phases. Then, generating the register clock signal includes the substeps of serially supplying the frequency control word to a chain of phase selection registers clocked by the register clock signal (Step 1608a), and serially selecting second signal phases in response to the first pattern (Step 1608b). In turn, serially selecting second signal phases in response to the first pattern may include substeps. Step 1608b1 generates a sequence of phase selection register output pulses in response to the register clock signal and the first pattern. Step 1608b2 uses the generated register output pulses to select the phases of the second signal.

In another aspect, supplying the second signal having the plurality of phases (Step 1602b) includes supplying a second signal with eight equally-spaced phases, each output offset from an adjoining output by 45°. Then, generating the register clock signal in Step 1608 includes generating a register clock signal with a frequency equal to the second signal frequency multiplied by one of the following numbers: 0.75, 0.875, 1, 1.125, and 1.25.

In a different aspect, generating the digital clock signal in Step 1610 includes serially supplying the duty cycle control word clocked by the register clock signal. Typically, the duty cycle control word is serially supplied simultaneously with the serial supply of the frequency control word. In one variation, the serial supply of the duty cycle control word includes supplying a second pattern followed by a load code. Then, the method comprises additional steps. Step 1603 detects the load code. Then, loading the frequency control word in Step 1604 includes simultaneously loading the frequency control word and duty cycle control word (Step 1606) in response to the load code.

In another aspect, loading the frequency control word with the first pattern in Step 1604 includes loading a first pattern with a plurality of sub-patterns. Then, generating the register clock signal in response to the first pattern (Step 1608) includes generating a sequence of register clock signal rates, where each rate is responsive to a sub-pattern in the first pattern. Further, loading the duty cycle control word with the second pattern (Step 1606) includes loading a second pattern with a plurality of sub-patterns. Then, generating the digital clock signal (Step 1610) includes generating a digital clock signal having a frequency and duty cycle responsive to the sequence of register clock rates and the sub-patterns in the second pattern.

For example, if Step 1606 loads a second pattern with a first sub-pattern of "1" bits, followed by a second sub-pattern of "0" bits, followed by the load code, then Step 1610 generates a digital clock signal period with a duty cycle high formed from the first sub-pattern and a duty cycle low formed from the second sub-pattern.

A system and method have been provided for controlling the frequency and duty cycles of a digitally generated clock using a multi-modulus prescalar divider. Examples of particular division ratios, phase spacings, and code words have been given to illustrate the invention. However, the invention is not limited to just these examples. Other variations and embodiments of the invention will occur to those skilled in the art.

We claim:

1. A method for controlling the duty cycle and frequency of a digitally generated clock, the method comprising:
   accepting a first clock signal having a fixed first frequency, as follows:
      dividing the first clock signal by integer n; and,
      supplying a second signal having a plurality of phases;
   loading a frequency control word with a first pattern into a first plurality of serially-connected registers;
   loading a duty cycle control word with a second pattern into a second plurality of serially-connected registers;
   generating a register clock signal in response to the first clock and the first pattern, as follows:
      serially supplying the frequency control word to a chain of phase selection registers clocked by the register clock signal; and,
      serially selecting second signal phases in response to the first pattern, as follows:
         generating a sequence of phase selection register output pulses in response to the register clock signal and the first pattern; and,
         using the generated register output pulses to select the phases of the second signal; and,
   generating the digital clock signal having the frequency and the duty cycle responsive to the register clock signal and the second pattern.

2. The method of claim 1 wherein generating the digital clock signal includes serially supplying the duty cycle control word clocked by the register clock signal.

3. The method of claim 2 wherein serially supplying the duty cycle control word includes simultaneously supplying the duty cycle control word with the serial supply of the frequency control word.

4. The method of claim 3 wherein serially supplying the duty cycle control word includes supplying a second pattern followed by a load code;
   the method further comprising;
   detecting the load code; and,
   wherein loading the frequency control word includes simultaneously loading the frequency control and duty cycle control words in response to the load code.

5. The method of claim 1 wherein supplying the second signal having the plurality of phases includes supplying a second signal with eight equally-spaced phases, each output offset from an adjoining output by 45°; and,
   wherein generating the register clock signal includes generating a register clock signal with a frequency equal to the second signal frequency multiplied by a number selected from a group consisting of 0.75, 0.875, 1, 1.125, and 1.25.

6. The method of claim 1 wherein loading the frequency control word with the first pattern includes loading a first pattern with a plurality of sub-patterns; and,
   wherein generating the register clock signal in response to the first pattern includes generating a sequence of register clock signal rates, where each rate is responsive to a sub-pattern in the first pattern.

7. The method of claim 6 wherein loading the duty cycle control word with the second pattern includes loading a second pattern with a plurality of sub-patterns; and,
   generating the digital clock signal includes generating a digital clock signal having a frequency and duty cycle responsive to the sequence of register clock rates and the sub-patterns in the second pattern.

8. The method of claim 7 wherein loading the second pattern with the plurality of sub-patterns includes loading a pattern comprising a first sub-pattern of "1" bits, followed by a second sub-pattern of "0" bits, followed by the load code; and,
   wherein generating the digital clock signal includes generating a digital clock signal period with a duty cycle high formed from the first sub-pattern and a duty cycle low formed from the second sub-pattern.

9. A system for controlling the duty cycle and frequency of a digitally generated clock, the system comprising:
   a multi-modulus prescalar divider with an input to accept a first clock signal having a fixed first frequency, an interface to accept a serial frequency control word, and an output to supply a register clock signal in response to the first clock signal and the frequency control word;
   a shift register subsystem including:
      an interface to accept the register clock signal;
      a first plurality of serially-connected registers having a parallel interface to parallely load the frequency control word and to serially supply the frequency control word to the multi-modulus prescalar divider in response to the register clock signal;
      a second plurality of serially-connected registers having a parallel interface to parallely load a duty cycle control word and to serially supply the digital clock signal having a frequency and the duty cycle responsive to the register clock signal and the duty cycle control word;
      a pattern detector circuit having an input to accept the serially supplied duty cycle control word, the pattern detector having an output to supply a load signal in response to detecting a load code in the duty cycle control word; and,
   wherein the first and second plurality of shift registers load new frequency control and duty cycle control words, respectively, in response to the load code.

10. The system of claim 9 wherein the multi-modulus prescalar divider includes:
    a divider module having an input to accept the first clock and a plurality of outputs to supply a second signal with a corresponding plurality of phases;
    a phase selection multiplexer (MUX) having a plurality of inputs to accept the second signal phases, a control port to accept a phase selection signal, and an output to supply a selected phase; and,
    a chain of serially-connected phase selection registers, each register having an input gate to receive the frequency control word and a clock input to receive the register clock signal, and an output to supply the phase selection signal, in response to the frequency control word and the register clock signal.

11. The system of claim 10 wherein the first plurality of shift registers load a frequency control word with a first pattern; and,
    wherein the phase selection MUX supplies a register clock signal having a frequency responsive to the first pattern.

12. The system of claim 11 wherein the chain of serially-connected phase selection registers supplies a sequence of register output pulses representing the phase selection signal in response to the first pattern; and,
    wherein the phase selection MUX supplies a register clock signal having a frequency responsive to the sequence of register output pulses.

13. The system of claim 12 wherein the divider module supplies eight equally-spaced phases, each output offset from an adjoining output by 45°; and, wherein the phase selection MUX supplies a register clock signal with a frequency equal to the second signal frequency multiplied by a number selected from a group consisting of 0.75, 0.875, 1, 1.125, and 1.25.

14. The system of claim 12 wherein the first plurality of shift registers load a frequency control word first pattern with a plurality of sub-patterns; and, wherein the phase selection MUX supplies a sequence of register clock signal rates, where each rate is responsive to a sub-pattern in the first pattern.

15. The system of claim 14 wherein the second plurality of shift registers loads a duty cycle control word with a second pattern and supplies a digital clock signal having a frequency and duty cycle responsive to the second pattern.

16. The system of claim 15 wherein the second plurality of shift registers loads a duty cycle control, word second pattern with a plurality of sub-patterns, and supplies a digital clock signal having a frequency and duty cycle responsive to the sequence of register clock rates and the sub-patterns in the second pattern.

17. The system of claim 16 wherein the second plurality of shift registers loads a second pattern comprising a first sub-pattern of "1" bits, followed by a second sub-pattern of "0" bits, followed by a load code, and supplies a digital clock signal period with a duty cycle high formed from the first sub-pattern and a duty cycle low formed from the second sub-pattern.

18. A system for controlling the duty cycle and frequency of a digitally generated clock, the system comprising:

a multi-modulus prescalar divider with an input to accept a first clock signal having a fixed first frequency, an interface to accept a serial frequency control word, and an output to supply a register clock signal in response to the first clock signal and the frequency control word, the multi-modulus prescalar divider including:

a divider module having an input to accept the first clock and a plurality of outputs to supply a second signal with a corresponding plurality of phases;

a phase selection multiplexer (MUX) having a plurality of inputs to accept the second signal phases, a control port to accept a phase selection signal, and an output to supply the register clock signal having a selected phase, with a frequency responsive to a first pattern and a sequence of register output pulses; and, a chain of serially-connected phase selection registers, each register having an input gate to receive the frequency control word and a clock input to receive the register clock signal, and an output to supply the sequence of register output pulses representing the phase selection signal, in response to the frequency control word, the first pattern and the register clock signal;

a shift register subsystem including:

an interface to accept the register clock signal;

a first plurality of serially-connected registers having a parallel interface to parallely load the frequency control word with the first pattern, and to serially supply the frequency control word to the multi-modulus prescalar divider in response to the register clock signal;

a second plurality of serially-connected registers having a parallel interface to parallely load a duty cycle control word and to serially supply the digital clock signal having the frequency and the duty cycle responsive to the register clock signal and the duty cycle control word.

19. The system of claim 18 wherein the divider module supplies eight equally-spaced phases, each output offset from an adjoining output by 45°; and, wherein the phase selection MUX supplies a register clock signal with a frequency equal to the second signal frequency multiplied by a number selected from a group consisting of 0.75, 0.875, 1, 1.125, and 1.25.

20. The system of claim 18 wherein the first plurality of shift registers load a frequency control word first pattern with a plurality of sub-patterns; and, wherein the phase selection MUX supplies a sequence of register clock signal rates, where each rate is responsive to a sub-pattern in the first pattern.

* * * * *